(12) United States Patent
Su

(10) Patent No.: US 12,382,106 B2
(45) Date of Patent: Aug. 5, 2025

(54) RESHAPING FUNCTIONS FOR HDR IMAGING WITH CONTINUITY AND REVERSIBILITY CONSTRAINTS

(71) Applicant: DOLBY LABORATORIES LICENSING CORPORATION, San Francisco, CA (US)

(72) Inventor: Guan-Ming Su, Fremont, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 288 days.

(21) Appl. No.: 17/920,384

(22) PCT Filed: Apr. 20, 2021

(86) PCT No.: PCT/US2021/028237
§ 371 (c)(1),
(2) Date: Oct. 20, 2022

(87) PCT Pub. No.: WO2021/216607
PCT Pub. Date: Oct. 28, 2021

(65) Prior Publication Data
US 2023/0300381 A1 Sep. 21, 2023

Related U.S. Application Data

(60) Provisional application No. 63/013,063, filed on Apr. 21, 2020.

(30) Foreign Application Priority Data

Apr. 21, 2020 (EP) .................................... 20170567

(51) Int. Cl.
*H04N 19/85* (2014.01)
*H04N 19/182* (2014.01)
*H04N 19/98* (2014.01)

(52) U.S. Cl.
CPC ........... *H04N 19/85* (2014.11); *H04N 19/182* (2014.11); *H04N 19/98* (2014.11)

(58) Field of Classification Search
CPC ....... H04N 19/198; H04N 19/85; H04N 19/98
See application file for complete search history.

(56) References Cited

U.S. PATENT DOCUMENTS

| 8,811,490 B2 | 8/2014 | Su |
| 9,584,811 B2 | 2/2017 | Su |

(Continued)

FOREIGN PATENT DOCUMENTS

| CN | 105324997 A | 2/2016 |
| CN | 105393525 A | 3/2016 |

(Continued)

OTHER PUBLICATIONS

ITU-R BT. 2100 "Image Parameter Values for High Dynamic Range Television for Use in Production and International Programme Exchange" ITU, Jun. 2017.

(Continued)

*Primary Examiner* — On S Mung

(57) ABSTRACT

Methods and systems for generating a set of forward and backward reshaping functions for the efficient coding of high-dynamic range (HDR) images are provided. Given an initial set of forward reshaping functions, output forward reshaping functions are constructed by a) using the forward reshaping functions to generate a first set of corresponding backward reshaping functions b) generating a second set of backward reshaping functions using a multi-segment polynomial representation with a common set of pivot points c) generating an output set of backward reshaping functions by optimizing the polynomial representation of the second set of backward reshaping functions to minimize gap values between consecutive segments and d) using the output set of backward reshaping functions to generate the output set of (Continued)

forward reshaping functions by minimizing the distance between original input HDR codewords and reconstructed HDR codewords.

19 Claims, 4 Drawing Sheets

(56) References Cited

U.S. PATENT DOCUMENTS

| | | |
|---|---|---|
| 10,032,262 B2 | 7/2018 | Kheradmand |
| 10,264,287 B2 | 4/2019 | Wen |
| 10,701,375 B2 | 6/2020 | Su |
| 2017/0221189 A1 | 8/2017 | Kheradmand |
| 2018/0167637 A1 | 6/2018 | Yin |
| 2018/0278967 A1 | 9/2018 | Kerofsky |
| 2022/0046245 A1 | 2/2022 | Kadu |

FOREIGN PATENT DOCUMENTS

| | | |
|---|---|---|
| CN | 108885783 A | 11/2018 |
| EP | 3621307 A1 | 3/2020 |
| WO | 2017024042 A2 | 2/2017 |
| WO | 2017165494 A2 | 9/2017 |
| WO | 2019217751 A1 | 11/2019 |
| WO | 2021216767 | 10/2021 |

OTHER PUBLICATIONS

ITU-R BT.709-6 Parameter Values for the HDTV Standards for Production and International Programme Exchange, Jun. 2015.

Minoo, K. et al "Description of the reshaper Parameters Derivation Process in ETM reference software" JCT-VC Meeting, Feb. 2016, video coding of ISO/IEC JTC1/SC29/WG11 and ITU-T SG. 16.

Recommendation ITU-R BT.2020-2 "Parameter Values for Ultra-High Definition Television Systems for Production and International Programme Exchange" Oct. 2015.

SMPTE 2084:2014 "High Dynamic Range Electro-Optical Transfer Function of Mastering Reference Displays" Aug. 16, 2014.

United States Patent US 12,382,106 B2

RESHAPING FUNCTIONS FOR HDR IMAGING WITH CONTINUITY AND REVERSIBILITY CONSTRAINTS

CROSS-REFERENCE TO RELATED APPLICATIONS

This application claims priority to U.S. Provisional Application No. 63/013,063 and European Patent Application No. 20170567.0, both filed on Apr. 21, 2020, each of which is incorporated by reference in its entirety.

TECHNOLOGY

The present invention relates generally to images. More particularly, an embodiment of the present invention relates to generating a family of reshaping functions for HDR imaging which satisfy both continuity and reversibility constraints.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the 14-15 orders of magnitude of the human visual system (HVS). In practice, the DR over which a human may simultaneously perceive an extensive breadth in intensity range may be somewhat truncated, in relation to HDR.

In practice, images comprise one or more color components (e.g., luma Y and chroma Cb and Cr) wherein each color component is represented by a precision of n-bits per pixel (e.g., n=8). Using linear or gamma luminance coding, images where n≤8 (e.g., color 24-bit JPEG images) are considered images of standard dynamic range, while images where n>8 may be considered images of enhanced or high dynamic range. HDR images may also be stored and distributed using high-precision (e.g., 16-bit) floating-point formats, such as the OpenEXR file format developed by Industrial Light and Magic.

Most consumer desktop displays currently support luminance of 200 to 300 cd/m² or nits. Most consumer HDTVs range from 300 to 500 nits with new models reaching 1000 nits (cd/m²). Such conventional displays thus typify a lower dynamic range (LDR), also referred to as a standard dynamic range (SDR), in relation to HDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more).

In a traditional image pipeline, captured images are quantized using a non-linear opto-electronic function (OETF), which converts linear scene light into a non-linear video signal (e.g., gamma-coded RGB or YCbCr). Then, on the receiver, before being displayed on the display, the signal is processed by an electro-optical transfer function (EOTF) which translates video signal values to output screen color values. Such non-linear functions include the traditional "gamma" curve, documented in ITU-R Rec. BT.709 and BT. 2020, the "PQ" (perceptual quantization) curve described in SMPTE ST 2084, and the "HybridLog-gamma" or "HLG" curve described in and Rec. ITU-R BT. 2100.

As used herein, the term "reshaping" or "remapping" denotes a process of sample-to-sample or codeword-to-codeword mapping of a digital image from its original bit depth and original codewords distribution or representation (e.g., gamma, PQ, or HLG and the like) to an image of the same or different bit depth and a different codewords distribution or representation. Reshaping allows for improved compressibility or improved image quality at a fixed bit rate. For example, without limitation, forward reshaping may be applied to 10-bit or 12-bit PQ-coded HDR video to improve coding efficiency in a 10-bit video coding architecture. In a receiver, after decompressing the received signal (which may or may not be reshaped), the receiver may apply an inverse (or backward) reshaping function to restore the signal to its original codeword distribution and/or to achieve a higher dynamic range.

Reshaping can be static or dynamic. In static reshaping, a single reshaping function is generated and is being used for a single stream or across multiple streams. In dynamic reshaping, the reshaping function may be customized based on the input video stream characteristics, which can change at the stream level, the scene level, or even at the frame level. Dynamic reshaping is preferable; however, certain devices may not have enough computational power to support it. As appreciated by the inventor here, improved techniques for efficient image reshaping when displaying video content, especially HDR content, are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1A:
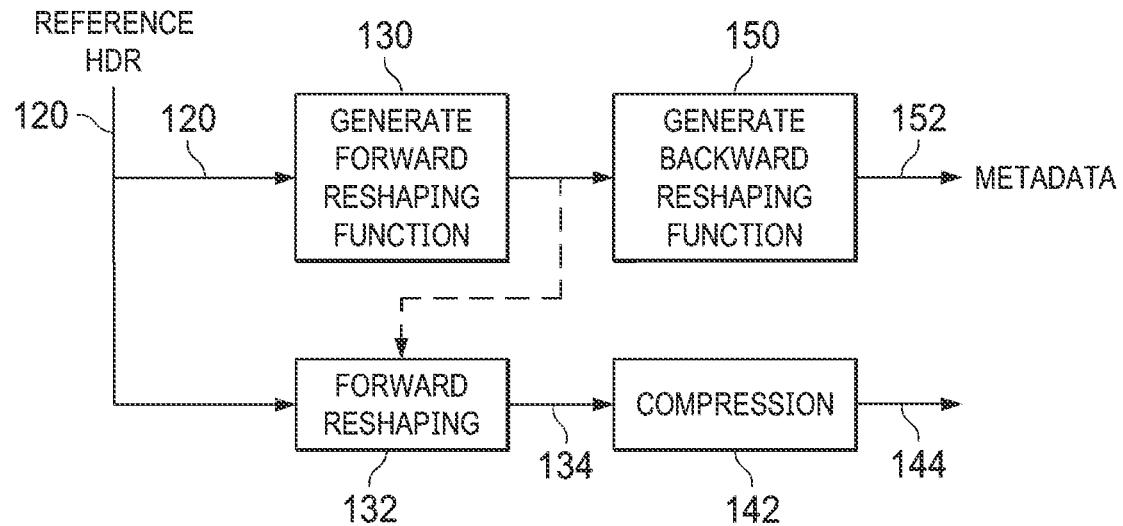
FIG. 1A depicts an example single-layer encoder for HDR data using a reshaping function according to prior art.

Image reshaping techniques for the efficient coding of images are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

SUMMARY

Example embodiments described herein relate to image reshaping. In an embodiment, in an apparatus comprising one or more processors, a processor receives input pairs of reference images in HDR and SDR. Given an initial set of forward reshaping functions generated using the reference HDR and SDR images, sets of output forward and backward reshaping functions are constructed by a) using the initial set of the forward reshaping functions to generate a first set of corresponding backward reshaping functions b) generating a second set of backward reshaping functions, wherein each backward reshaping function is represented using a multi-segment polynomial representation with a common set of pivot points c) generating the output set of backward reshaping functions by optimizing the polynomial representation of the second set of backward reshaping functions to minimize the gap output values between consecutive segments and d) using the output set of backward reshaping functions to generate the output set of forward reshaping functions by minimizing the distance between the reference HDR values and reconstructed HDR values.

In an embodiment to generate an output backward reshaping function wherein gap values between segments are minimized, a processor receives a first set of input images in a first dynamic range (e.g., SDR) and a second set of input images in a second dynamic range (e.g., HDR), wherein corresponding pairs between the first set and the second set of input images represent an identical scene. The processor:

accesses a first set of backward reshaping functions generated based on the first set of input images and the second set of input images, wherein a backward reshaping function maps pixel codewords from a first codeword representation in the first dynamic range to a second codeword representation in the second dynamic range, and each backward reshaping function is characterized by a reshaping-index parameter and segment parameters for a segment-based representation of the backward reshaping functions with a set of common pivots;

adjusts the segment parameters in the first set of backward reshaping functions to generate an output set of backward reshaping functions with the set of common pivots as the first set of backward reshaping functions but with adjusted segment-based polynomial representation, wherein adjusting the segment parameters in a backward reshaping function to generate updated polynomial coefficients comprises:

for a segment of a backward reshaping function between a first pivot and a second pivot, wherein the segment is represented in an original polynomial representation by three original polynomial coefficients:
accesses the three original polynomial coefficients of the segment; and
for one or more new values for a first updated polynomial coefficient for the segment;
solves for a second and a third updated polynomial coefficient for the segment based on the first pivot and the second pivot, the new value for the first updated polynomial coefficient, and corresponding outputs for the first pivot and the second pivot according to the original polynomial representation of the segment; and
upon satisfying a distortion criterion, updates an optimum set of polynomial coefficients for the segment with the updated polynomial coefficients.

According to some embodiments, there is provided a method for generating a reshaping function with a processor, the method comprising:

accessing a first set of input images in a first dynamic range and a second set of input images in a second dynamic range, wherein corresponding pairs between the first set and the second set of input images represent an identical scene;

accessing a first set of backward reshaping functions generated based on the first set of input images and the second set of input images, wherein a backward reshaping function maps pixel codewords from a first codeword representation in the first dynamic range to a second codeword representation in the second dynamic range, and each backward reshaping function is characterized by a reshaping-index parameter and segment parameters for a segment-based representation of the backward reshaping functions with a set of common pivots (e.g. the set of common pivots may be common among the backward reshaping functions of the first set of backward reshaping functions); and adjusting the segment parameters in the first set of backward reshaping functions to generate an output set of backward reshaping functions with the set of common pivots as the first set of backward reshaping functions but with adjusted segment-based polynomial representation, wherein adjusting the segment parameters in a backward reshaping function to generate updated polynomial coefficients comprises:

for a segment of a backward reshaping function between a first pivot and a second pivot, wherein the segment is represented in an original polynomial representation by three original polynomial coefficients:
accessing the three original polynomial coefficients of the segment;
initializing a distortion parameter to a first distortion value; and
for one or more new values for a first updated polynomial coefficient for the segment:
solving for a second and a third updated polynomial coefficient for the segment based on the first pivot and the second pivot, the new value for the first updated polynomial coefficient, and corresponding outputs for the first pivot and the second pivot according to the original polynomial representation of the segment; and
upon satisfying a distortion criterion, updating an optimum set of polynomial coefficients for the segment with the updated polynomial coefficients.

The first set of backward reshaping functions may be generated from an initial set of the forward reshaping functions generated using the first set of input images and the second set of input images.

Each backward reshaping function (e.g. of the first set of backward reshaping functions) may be characterized by a reshaping-index parameter and segment parameters in the sense of being defined by a reshaping-index parameter and segment parameters.

Each backward reshaping function may be characterized by a different reshaping-index parameter.

Each backward reshaping function and/or forward reshaping function may be computed for characteristics being different among the input images of the second set of input images. The characteristics may comprise a measure or metric of an average luminance of an input image in the second dynamic range. For example, each backward reshaping function (and forward reshaping function) may be computed for a different average luminance of an input image in the second dynamic range.

According to some embodiments, the method may further comprise generating a set of output forward reshaping functions based on the set of output backward reshaping functions, wherein a forward reshaping function maps pixel codewords from the second codeword representation in the second dynamic range to the first codeword representation in the first dynamic range. Each output forward reshaping function of the set of output forward reshaping functions may be characterized by a reshaping-index parameter (e.g. a different reshaping-index parameter) and segment parameters for a segment-based representation of the output forward reshaping functions with a set of common pivots. Generating an output forward reshaping function corresponding to an output backward reshaping function may comprise: for each input codeword in the second dynamic range identifying a codeword index for the output backward reshaping function which minimizes a difference between codewords generated by the backward reshaping function and the input codeword.

According to some embodiments, the method may further comprise generating a new forward reshaping function by interpolating between two forward reshaping functions of the set of output forward reshaping functions. Thereby, a new forward reshaping function may be generated based on two forward reshaping functions characterized by different reshaping-index parameters.

According to some embodiments, the method may further (or alternatively) comprise generating a new backward reshaping function by interpolating between two backward reshaping functions of the output set of backward reshaping functions. Thereby, a new backward reshaping function may be generated based on two backward reshaping functions characterized by different reshaping-index parameters.

Interpolating between the two backward reshaping functions or the two forward reshaping functions may comprise generating an interpolated set of polynomial coefficients for each segment of the new backward or forward reshaping function, based on a respective set of polynomial coefficients of the two backward or forward reshaping functions. The interpolated set of polynomial coefficients may be generated using linear interpolation, e.g. between corresponding polynomial coefficients of the set of polynomial coefficients of the two backward or forward reshaping functions.

The method may further comprise selecting the two backward reshaping functions or forward reshaping functions based on a measure of an average luminance of an input HDR image (e.g. in the second dynamic range) to be encoded. Each output backward reshaping function and/or each output forward reshaping function may be computed for a different average luminance of an input image in the second dynamic range. The two backward reshaping functions or forward reshaping functions may be selected such that the average luminance of the input HDR image to be encoded lies between the respective measures of average luminance for which the selected two backward or forward reshaping functions are computed. The method may further comprise encoding the input HDR image using the new forward reshaping function.

Example HDR Coding System

Figure 1B:
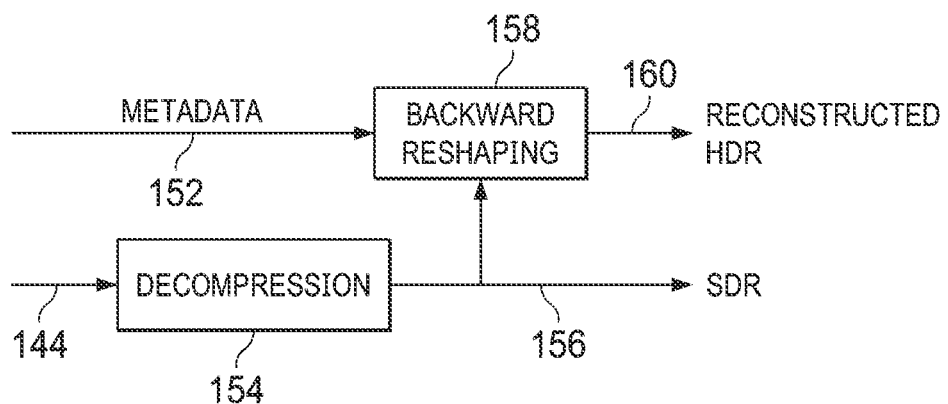
FIG. 1B depicts an example HDR decoder corresponding to the encoder of FIG. 1A according to prior art.

As described in Ref. [1] and Ref. [2], FIG. 1A and FIG. 1B illustrate an example single-layer backward-compatible codec framework using image reshaping. More specifically, FIG. 1A illustrates an example encoder-side codec architecture, which may be implemented with one or more computing processors in an upstream video encoder. FIG. 1B illustrates an example decoder-side codec architecture, which may also be implemented with one or more computing processors in one or more downstream video decoders.

Under this framework, given reference HDR content (120), corresponding SDR content (134) (also to be referred as reshaped content) is encoded and transmitted in a single layer of a coded video signal (144) by an upstream encoding device that implements the encoder-side codec architecture. The SDR content is received and decoded, in the single layer of the video signal, by a downstream decoding device that implements the decoder-side codec architecture. Backward reshaping metadata (152) is also encoded and transmitted in the video signal with the SDR content so that HDR display devices can reconstruct HDR content based on the SDR content and the backward reshaping metadata.

As illustrated in FIG. 1A, the backward compatible SDR images, such as the SDR images (134), are generated using a forward reshaping mapping (132). Here, "backward-compatible SDR images" may refer to SDR images that are specifically optimized or color graded for SDR displays. A compression block 142 (e.g., an encoder implemented according to any known video coding algorithms, like AVC, HEVC, AV1, and the like) compresses/encodes the SDR images (134) in a single layer 144 of a video signal.

The forward reshaping function in 132 is generated using a forward reshaping function generator 130 based on the reference HDR images (120). Given the forward reshaping function, forward reshaping mapping (132) is applied to the HDR images (120) to generate reshaped SDR base layer 134. In addition, a backward reshaping function generator 150 may generate a backward reshaping function which may be transmitted to a decoder as metadata 152.

Examples of backward reshaping metadata representing/specifying the optimal backward reshaping functions may include, but are not necessarily limited to only, any of: inverse tone mapping function, inverse luma mapping functions, inverse chroma mapping functions, lookup tables (LUTs), polynomials, inverse display management coefficients or parameters, etc. In various embodiments, luma backward reshaping functions and chroma backward reshaping functions may be derived/optimized jointly or separately, may be derived using a variety of techniques as described in Ref. [2].

The backward reshaping metadata (152), as generated by the backward reshaping function generator (150) based on the SDR images (134) and the target HDR images (120), may be multiplexed as part of the video signal 144, for example, as supplemental enhancement information (SEI) messaging.

In some embodiments, backward reshaping metadata (152) is carried in the video signal as a part of overall image metadata, which is separately carried in the video signal from the single layer in which the SDR images are encoded in the video signal. For example, the backward reshaping metadata (152) may be encoded in a component stream in the coded bitstream, which component stream may or may not be separate from the single layer (of the coded bitstream) in which the SDR images (134) are encoded.

Thus, the backward reshaping metadata (152) can be generated or pre-generated on the encoder side to take advantage of powerful computing resources and offline encoding flows (including but not limited to content adaptive multiple passes, look ahead operations, inverse luma mapping, inverse chroma mapping, CDF-based histogram approximation and/or transfer, etc.) available on the encoder side.

The encoder-side architecture of FIG. 1A can be used to avoid directly encoding the target HDR images (120) into coded/compressed HDR images in the video signal; instead, the backward reshaping metadata (152) in the video signal can be used to enable downstream decoding devices to backward reshape the SDR images (134) (which are encoded in the video signal) into reconstructed images that are identical to or closely/optimally approximate the reference HDR images (120).

In some embodiments, as illustrated in FIG. 1B, the video signal encoded with the SDR images in the single layer (144) and the backward reshaping metadata (152) as a part of the overall image metadata are received as input on the decoder side of the codec framework. A decompression block 154 decompresses/decodes compressed video data in the single layer (144) of the video signal into the decoded SDR images (156). Decompression 154 typically corresponds to the inverse of compression 142. The decoded SDR images (156) may be the same as the SDR images (134), subject to quantization errors in the compression block (142) and in the decompression block (154), which may have been optimized for SDR display devices. The decoded SDR images (156) may be outputted in an output SDR video signal (e.g., over an HDMI interface, over a video link, etc.) to be rendered on an SDR display device.

In addition, a backward reshaping block 158 extracts the backward reshaping metadata (152) from the input video signal, constructs the optimal backward reshaping functions based on the backward reshaping metadata (152), and performs backward reshaping operations on the decoded SDR images (156) based on the optimal backward reshaping functions to generate the backward reshaped images (160) (or reconstructed HDR images). In some embodiments, the backward reshaped images represent production-quality or near-production-quality HDR images that are identical to or closely/optimally approximating the reference HDR images (120). The backward reshaped images (160) may be outputted in an output HDR video signal (e.g., over an HDMI interface, over a video link, etc.) to be rendered on an HDR display device.

In some embodiments, display management operations specific to the HDR display device may be performed on the backward reshaped images (160) as a part of HDR image rendering operations that render the backward reshaped images (160) on the HDR display device.

Example System for Adaptive Reshaping
Introduction

Reshaping can be static or dynamic. In static reshaping, a single reshaping function is generated and is being used for a single stream or across multiple streams. In dynamic reshaping, the reshaping function may be customized based on the input video stream characteristics, which can change at the stream level, the scene level, or even at the frame level. For example, in an embodiment, without limitation, one may generate reshaping functions according to a metric of the average luminance value in a frame or a scene, to be referred as L1-mid. For example, without limitation, in an embodiment with PQ-coded, RGB data, L1-mid may represent the average of max(R,G,B) values among all RGB pixels in a region of interest in a frame. In another embodiment, for YCbCr or ICtCp coded data, L1-mid may represent the average of all Y or I values in a region of interest in a frame (e.g., computing the average may exclude letterbox or sidebar areas in a frame).

Thus, for a 12-bit system, one may pre-construct all 4,096 possible functions; however, such an approach is time consuming and also rather impractical due to the huge memory requirements in a real system. In an embodiment, one may select to build a smaller set of L ($L<2^{bitdepth}$) curves as basis reshaping functions, store them in memory, and then generate additional functions for missing mid-luminance values by interpolating between the available L functions during run-time. This may be referred to as "Scalable-Static mode," since it combines a small set of statically-generated reshaping curves to generate the full set. For example, in an embodiment, for 10-bit signals, one may generate 13 basis forward functions for average luminance values in the set comprising {768 1024 1280 1536 1792 2048 2304 2560 2816 3072 3328 3584 3840}.

In an embodiment, to save bandwidth, a backwards reshaping function may be approximated using piece-wise linear or non-linear polynomials, where in such representation, polynomial segments are separated by pivot points. To facilitate the interpolation of polynomial coefficients (and avoid extra computation), in an embodiment, the pivot points in all precomputed reshaping functions should be aligned (e.g., common). This allows for much simpler interpolation among polynomials without concern about their pivot points.

Nomenclature

Consider a database containing a reference (or "master") HDR set and multiple SDR sets of images or video clips generated for different L1-mid values, that is, for each HDR image there is a set of corresponding SDR images using Yc0c1 color data (e.g., YCbCr data, with y=Y, c0=Cb, and c1=Cr). The SDR images can be generated from the HDR images either manually, with the help of a color grader, automatically, using automatic color mapping algorithms, or by using a combination of computer tools and human interaction.

Let $s_{ji}^{y,(l)}$, $s_{ji}^{c0,(l)}$, and $s_{ji}^{c1,(l)}$ denote the data values of the i-th pixel at the j-th frame or picture in the SDR database set which is generated from the l-th L1-mid mapping. Denote the number of pixels in each frame as P. Let the bit depth be denoted as HDR_bitdepth for HDR images and as SDR_bitdepth in the SDR images, then the number of possible codeword values in the HDR and SDR signals is given by $N^V=2^{HDR\_bitdepth}$ and $N^S=2^{SDR\_bitdepth}$, respectively.

As used herein, the term "unnormalized pixel value" denotes a value in [0, $2^B-1$], where B denotes the bit depth of the pixel values (e.g., B=8, 10, or 12 bits). As used herein, the term "normalized pixel value" denotes a pixel value in [0, 1).

In some embodiments, instead of operating at the pixel level, one may operate with average pixel values. For example, one may divide the input signal codewords into M non-overlapping bins (e.g., M=16, 32, or 64) with equal interval $w_b$ (e.g., for 16-bit input data, $w_b$=65,536/M) to cover the whole normalized dynamic range (e.g., (0,1]). Then, instead of operating with pixel values one may operate with the average pixel values within each such bin. Denote the number of bins in the SDR and the HDR signal as $M^S$ and $M^V$, respectively, and denote their corresponding intervals as $w_{bS}$ and $w_{bV}$. When operating at the pixel level, then, $M^S=N^S$, and/or $M^V=N^V$.

Denote the minimal and maximal luma values within the j-th frame or picture in the HDR database as $v_j^{y,L}$ and $v_j^{y,H}$. Denote the minimal and maximal luma values within the j-th frame in the SDR database as $s_j^{y,(l),L}$ and $s_j^{y,(l),H}$.

Constructing Individual Forward Reshaping Functions

Before building the family of basis reshaping functions, say, with common pivot points, one needs to build individual reshaping functions. In an embodiment and without limitation, such functions are built using the histogram—or cumulative density function—(CDF) matching approach used in Ref. [1-3]. For completeness, the algorithm is also described herein. The key steps include: a) collecting statistics (histograms) for the images in the database, b) generating a cumulative density function (CDF) for each set, c) applying CDF matching (Ref. [3]) to generate a reshaping function and d) clipping and smoothing the reshaping function. These steps are depicted in pseudocode in Tables 1 and 2.

TABLE 1

Example step for collecting statistics

// STEP 1: histogram initialization
// F denotes the number of SDR/HDR image pairs in the database
// F can vary in each database
// P denotes the number of pixels in an image
$h_b^{s,(l)} = 0$ for $b = 0, \ldots, M^S - 1$
$h_b^v = 0$ for $b = 0, \ldots, M^V - 1$
// STEP 2: scan for each pixel in the HDR and the l-th SDR database
to build histograms for (j = 0; j < F; j ++){
    for (i = 0 ; i < P ; i ++){

$$b^S = \left\lfloor \frac{s_{ji}^{y,(l)}}{w_{bS}} \right\rfloor$$

$$b^V = \left\lfloor \frac{v_{ji}^y}{w_{bV}} \right\rfloor$$

$h_{b^S}^{s,(l)}$++;   // histogram from l-th SDR database
        $h_{b^V}^v$++;   // histogram from HDR database
    }
}

TABLE 2

Example construction of a forward reshaping function with CDF matching

// STEP 1: initialization
$c_b^{s,(l)} = 0$ for $b = -1, \ldots, M^S - 1$
$c_b^v = 0$ for $b = -1, \ldots, M^V - 1$
// STEP 2: build CDF
for (b = 0:b < $M^S$; b ++){
    $c_b^{s,(l)} = c_{b-1}^{s,(l)} + h_b^{s,(l)}$
}
for (b = 0:b < $M^V$; b ++){
    $c_b^v = c_{b-1}^v + h_b^v$
}
// STEP 3: normalized CDF to be between [0 1]
for (b = 0; b < $M^S$; b ++){

$$c_b^{s,(l)} = \frac{c_b^{s,(l)}}{P}$$

}

TABLE 2-continued

Example construction of a forward reshaping function with CDF matching for (b = 0; b < $M^V$; b ++){

$$c_b^v = \frac{c_b^v}{P}$$

}
// STEP 4: histogram transfer
for (b = 0; b < $M^S$; b ++){
    // for each sample point in the first domain, find the corresponding CDF value
    // find the 2$^{nd}$ signal whose CDF cover the 1$^{st}$ domain's CDF.
    find k such that $c_{k-1}^{s,(l)} \leq c_b^v \leq c_k^{s,(l)}$
    // find the 2$^{nd}$ domain sample points
    perform interpolation based on $c_{k-1}^{s,(l)}$ and $c_k^{s,(l)}$ $$\tilde{T}_b^{F,(l)} = (k-1) + \frac{c_b^v - c_{k-1}^{s,(l)}}{c_k^{s,(l)} - c_{k-1}^{s,(l)}}$$

}
// STEP 5: curve clipping
// search flat areas at dark area
for (b = 1; b < $M^V$; b ++){
    if ($|\tilde{T}_b^{F,(l)} - \tilde{T}_{b-1}^{F,(l)}| > \Delta$){
        $v^{L,(l)} = $ clip3(b - 2, 0, $M^S - 1$);
        break;
    }
}
// search flat areas at bright area
for (b = $N^V - 1$; b > 0; b --){
    if ($|\tilde{T}_b^{F,(l)} - \tilde{T}_{b-1}^{F,(l)}| > \Delta$){
        $v^{H,(l)} = $ clip3(b + 1, 0, $M^V - 1$);
        break;
    }
}
// STEP 6: curve smoothing using varying window size
//    (can be speed up by using cumulative sum)
// lower end
for (b = 0; b $\leq v^{L,(l)}$; b ++){
    $T_b^{F,(l)} = \tilde{T}_b^{F,(l)}$
}
// higher end
for (b = $v^{H,(l)}$; b < $M^V - 1$; b ++){
    $T_b^{F,(l)} = \tilde{T}_b^{F,(l)}$
}
// mid-tone smoothing
for (b = $v^{L,(l)} + 1$; b < $v^{H,(l)}$; b ++){

$$W_b = \min\left\{b - v^{L,(l)} + 2, v^{H,(l)} - b + 2, \frac{W}{2}\right\}$$

$$W_b^- = \text{clip3}(b - W_b, 0, M^S - 1)$$

$$W_b^+ = \text{clip3}(b + W_b, 0, M^S - 1)$$

$$T_b^{F,(l)} = \frac{1}{W_b^+ - W_b^- + 1} \sum_{k=W_b^-}^{W_b^+} \tilde{T}_k^{F,(l)}$$

}
// STEP 7: rounding and clipping
$T_b^{F,(l)} = $ clip3(round($T_b^{F,(l)}$), $N^S - 1$);

In Table 2, the function y=clip3(x, Min, Max) is defined as:

$$y = \begin{cases} \text{Min} & \text{if } x \leq \text{Min} \\ \text{Max} & \text{if } x \geq \text{Max} \\ x & \text{otherwise} \end{cases}$$

In Table 2, the CDF-matching step (STEP 4) can be simply explained as follows. Consider that an SDR codeword $x_s$ corresponds to a specific CDF value c in the CDF $c^{s,(l)}$ and that an HDR codeword $x_v$ also corresponds to the same specific CDF value c in the CDF $c^{v,(l)}$, it is then determined that SDR value $s=x_s$ should be mapped to HDR value $x_v$. Alternatively, in STEP 4, for each SDR value $(x_s)$, one computes the corresponding SDR CDF value (say, c), and then tries to identify via simple linear interpolation from existing HDR CDF values the HDR value $(x_v)$ for which $c^{v,(l)}=c$.

By repeating the steps in Table 1 and 2 for each L1-mid value of interest one can generate the first set of forward reshaping functions, $T_b^{F,(l)}$, mapping an HDR input image (or frame) to a corresponding SDR output according to its L1-mid value or any other characteristics that was used to generate the l-th SDR database.

Constructing Individual Backward Reshaping Functions

Given the original set of individual forward reshaping functions, $T_b^{F,(l)}$, one may now generate corresponding individual backward reshaping functions $T_b^{B,(l)}$ (where SDR codewords are mapped to reconstructed HDR codewords. An example process is depicted in Table 3.

TABLE 3

Example process to generate a backward reshaping function

// find inverse mapping
for (b = 0; b < $M^S$ – 1; b++){

$\Phi_b = \{k | T_k^{F,(l)} == b\}$ if($\|\Phi_b\| > 0$)

$T_b^{B,(l)} = \frac{1}{\|\Phi_b\|} \sum_{k \in \Phi_b} k$ end
}
// fill up missing data
for (b = 0; b < $M^S$ – 1; b++){
   $\Phi_b = \{k | T_k^{F,(l)} == b\}$
   if($\|\Phi_b\| == 0$)
     $T_b^{B,(l)}$ is interpolated from nearest two available BLUT.
   end
end Constructing a Family of Backward Reshaping Functions with Common Pivot Points At this stage, there exist a set of backward reshaping functions $\{T_b^{B,(l)}\}$ and a set of forward reshaping functions $\{T_b^{F,(l)}\}$. In an embodiment, the luma backward reshaping function may be represented/approximated by a multi-piece polynomial approximation (e.g., using eight second-order polynomials), where polynomial segments are separated by pivot points. To enable the interpolation among the existing L1-mid functions, it is desirable to have common pivot points for all $\{T_b^{B,(l)}\}$ functions. In an embodiment, the set of common pivots is generated based on the techniques described in Ref. [6], which is summarized below.

For each SDR codeword b, compute its normalized value $$s_b^Y = \frac{b}{N^s}. \quad (1)$$

Denote the pivot points as $\{\lambda_m\}$, m=0, 1, ..., K, where K denotes the total number of segments. For example, [$\lambda_m$, $\lambda_{m+1}$), denotes the m-th polynomial segment. The m-th polynomial is selected when the input value, b, is within $\lambda_m$ and $\lambda_{m+1}$. In an embodiment, both b and $\lambda_m$ values are integers in [0, $2^B$), where B denotes the SDR bit depth. The m-th second-order polynomial of the l-th L1-mid reshaping function is used to approximate the input backward reshaping function, generated earlier, as:

$$T_b^{B,(l)} \approx \sum_{k=0}^{2} a_{mk}^{(l)} \cdot (s_b^Y)^k, \text{ when } \lambda_m \le b < \lambda_{m+1}. \quad (2)$$

To reduce the gap between two nearby polynomials, an overlapped constraint may be applied to smooth the transition around the pivot points. The overlapped window size is denoted as $W_m$. To achieve a minimal gap, the design optimization goal can be formulated as $$J = \min_{\{a_{mk}^{(l)}\}} \max \left| \sum_{k=0}^{2} a_{mk}^{(l)} \cdot (s_b^Y)^k - \sum_{k=0}^{2} a_{mk}^{(l)} \cdot (s_{b-1}^Y)^k \right|, \quad (3)$$

for max $\{\lambda_m - W_m, \lambda_m^s\} \le b \le \min\{\lambda_{m+1} + W_m - 1, \lambda_m^e\}$ and $0 \le l \le L-1$.

In equation (3), the pivot points may be bounded by specific communication constraints (e.g., a valid range of SMPTE 274M codeword values) which can be expressed as a lower bound, $\lambda_m^s$, and as upper bound, $\lambda_m^e$, where values below $\lambda_m^s$ and above $\lambda_m^e$ will be clipped. For example, for 8-bit signals, the broadcast-safe area is [16, 235] instead of [0, 255].

Using an overlapped window, denote the extended points as $\lambda_m^L = \max\{\lambda_m - W_m, \lambda_m^s\}$ $\lambda_m^R = \min\{\lambda_{m+1} + W_m - 1, \lambda_m^e\}$.

then, in a matrix representation, $$S_m = \begin{bmatrix} 1 & s_{\lambda_m^L}^Y & (s_{\lambda_m^L}^Y)^2 \\ 1 & s_{\lambda_m^L+1}^Y & (s_{\lambda_m^L+1}^Y)^2 \\ \vdots & \vdots & \vdots \\ 1 & s_{\lambda_m^R-1}^Y & (s_{\lambda_m^R-1}^Y)^2 \\ 1 & s_{\lambda_m^R}^Y & (s_{\lambda_m^R}^Y)^2 \end{bmatrix}$$

$$t_m^{(l)} = \begin{bmatrix} T_{\lambda_m^L}^{B,(l)} \\ T_{\lambda_m^L+1}^{B,(l)} \\ \vdots \\ T_{\lambda_m^R-1}^{B,(l)} \\ T_{\lambda_m^R}^{B,(l)} \end{bmatrix} \quad (4)$$

$$a_m^{(l)} = \begin{bmatrix} a_{m0}^{(l)} \\ a_{m1}^{(l)} \\ a_{m2}^{(l)} \end{bmatrix}$$

and equation (3) can be expressed as $$J_m^{(l)} = \min_{a_m^{(l)}} \| t_m^{(l)} - S_m a_m^{(l)} \|^2. \quad (5)$$

Under a least square optimization, a solution is given by $$a_m^{(l),opt} = (S_m^T S_m)^{-1} (S_m^T t_m^{(l)}). \quad (6)$$

Then, the overall problem to solve is given by:
 Solve for $\{a_m^{(l)}\}$ for all m and for all l
 Solve for $\{\lambda_m\}$ for all m using a set of $\{W_m\}$ windowing parameters,
under a combination of optimization criteria. The set of overlapping window sizes $\{W_m\}$ can vary to assist in searching for the best result. An example process to solve for the set of multi-segment polynomials with a set of common pivots is depicted in Table 4, where one may apply a Monte Carlo simulation by randomizing the pivot points and overlapping windows for U iterations (e.g., U=10,000)

TABLE 4

Example process to identify common pivots and polynomial segments in a set of backward reshaping functions Initialize $\{a_m^{(l),opt}\}$ and $\{\lambda_m^{opt}\}$
$J^{opt}$ = inf
for (u = 0; u < U; u++){ // U denotes the upper number of iteration searches
 // STEP 1: set pivot points
 valid_pivot_flag = 0;
 while(valid_pivot_flag == 0 ){
  Randomize $\{\lambda_m\}$ within range $[\lambda_m^s, \lambda_m^e]$ for all m
  Randomize $\{W_m\}$ for all m
  Obtain $\lambda_m^L = \max\{\lambda_m - W_m, \lambda_m^s\}$ and $\lambda_m^R = \min\{\lambda_{m+1} + W_m - 1, \lambda_m^e\}$
  if ($\lambda_m < \lambda_{m+1}$ for all m){
   valid_pivot_flag = 1
  }
 }
 // STEP 2: compute the polynomial coefficients for each piece in each basis
 for (m = 0; m < K; m++ ) { // number of segments
  compute $S_m$
  for (l = 0; l < L; l++ ) { // number of basis functions
   obtain response vector $t_m^{(l)}$
   compute least squared solution $a_m^{(l)} = (S_m^T S_m)^{-1}(S_m^T t_m^{(l)})$
   (Optional) Check for implementation constraints. If there is a violation, skip
and move to next iteration
   compute predicted value
$$\hat{T}_b^{B,(l)} = \sum_{k=0}^{2} a_{mk}^{(l)} \cdot (s_b^Y)^k \text{ for } b \in [\lambda_m, \lambda_{m+1} - 1]$$
  }
 }
 // STEP 3: compute the objective function
 $J^u = \max\{|\hat{T}_b^{B,(l)} - \hat{T}_{b-1}^{B,(l)}| | b \in [0, M^S - 1], l \in [0, L - 1]\}$
 // update the optimal solution
 If ($J^u < J^{opt}$){
  $J^{opt} = J^u$
  $\{a_m^{(l),opt}\} = \{a_m^{(l)}\}$
  $\{\lambda_m^{opt}\} = \{\lambda_m\}$
 }
}

In Step 2, in regard to checking for implementation constraints, some embodiments may restrict the accuracy of the polynomial coefficients (e.g., to signed 7-bit or 8-bit integer values, and the like).

As discussed, the above joint optimization might not output a smooth backward reshaping function, without jumps near the pivot points. In an embodiment, another round of optimization to minimize the gaps may needs to be performed as follows.

Consider the pivot point $\lambda_{m+1}$, where the ending points of two polynomials (the m-th and m+1 polynomials) are supposed to connect together. When predicting HDR values using the received SDR codewords, at location at $\lambda_m$, using a second-order polynomial, the equation of applying the m-th polynomial is:

$$\hat{v}_{m,\lambda_m}^Y = a_{m,0}^{(l)} + a_{m,1}^{(l)} \cdot (\lambda^m) + a_{m,2}^{(l)} \cdot (\lambda_m)^2. \quad (7)$$

For the rest of the codewords in the m-th segment, predicted HDR values are computed as:

$$\hat{v}_{m,b}^Y = a_{m,0}^{(l)} + a_{m,1}^{(l)} \cdot (s_b^Y) + a_{m,2}^{(l)} \cdot (s_b^Y)^2, \text{ when} \quad (8)$$
$$\lambda_m < b < \lambda_{m+1}.$$

To reduce the gap between pivots, in an embodiment, the goal is to adjust the polynomial coefficients of the m-th segment so that the revised m-th polynomial satisfies output values at both $(\lambda_m, \hat{v}_{m,\lambda_m}^Y)$ and $(\lambda_{m+1}, \hat{v}_{m+1,\lambda_{m+1}}^Y)$ for the original polynomials, that is, equation (7) and $$\hat{v}_{m+1,\lambda_{m+1}}^Y = a_{m+1,0}^{(l)} + a_{m+1,1}^{(l)} \cdot (\lambda_{m+1}) + a_{m+1,2}^{(l)} \cdot (\lambda_{m+1})^2. \quad (9)$$

A second-order polynomial is fully defined by three coefficients, thus, given only the two equations (7) and (9), solving for three unknowns is an under-determined problem. Assuming one of the revised polynomial coefficients $\{a'_{m,0}{}^{(l)}, a'_{m,1}{}^{(l)}, a'_{m,2}{}^{(l)}\}$ is known (e.g., $a'_{m,0}{}^{(l)}$), the remaining ones (e.g., $a'_{m,1}{}^{(l)}$ and $a'_{m,2}{}^{(l)}$) can be obtained from equations (7) and (9) as a closed-form solution of a system with two equations and two unknowns. For example, with $a'_{m,0}{}^{(l)}$ presumed known, the solution for the other two is given by $$a_{m,1}^{(l)} = \frac{(\lambda_{m+1})^2(\hat{v}_{m,\lambda_m}^Y - a_{m,0}^{(l)}) - (\lambda_m)^2(\hat{v}_{m+1,\lambda_{m+1}}^Y - a_{m,0}^{(l)})}{\lambda_m \lambda_{m+1}(\lambda_{m+1} - \lambda_m)}, \quad (10)$$

$$a_{m,2}^{(l)} = \frac{(\lambda_{m+1})^2(\hat{v}_{m,\lambda_m}^Y - a_{m,0}^{(l)}) - \lambda_m(\hat{v}_{m+1,\lambda_{m+1}}^Y - a_{m,0}^{(l)})}{\lambda_m \lambda_{m+1}(\lambda_m - \lambda_{m+1})}.$$

Since $a'_{m,0}{}^{(l)}$ is actually unknown, one can formulate this problem as an optimization problem to find the optimal coefficients $\{a_{m,0}{}^{(l),*}, a_{m,2}{}^{(l),*}, a_{m,2}{}^{(l),*}\}$, such that the sum of differences between the original HDR value and the new HDR value using the new polynomial coefficients is minimized, that is:

$$\{a_{m,0}^{(l),*}, a_{m,2}^{(l),*}, a_{m,2}^{(l),*}\} = \text{argmin} \sum_{b=\lambda_m+1}^{\lambda_{m+1}} \left| \sum_{k=0}^{2} a_{mk}^{(l)} \cdot (b_b^Y)^k - \hat{v}_{m,b}^Y \right|. \quad (11)$$

There is no need to include point $\lambda_m$ in the optimization since the equations have already passed this point. In an embodiment, without limitation, the optimal solution can be searched among a range of values for $a'_{m,0}{}^{(l)}$.

For the last segment, the (m+1)-th segment is outside the last pivot point. In an embodiment, the curve after the last point may be a constant, extending from the last output value from the previous polynomial. Therefore, for m=K, one can set $$a_{K+1,0}^{(l)} = a_{K,0}^{(l)} + a_{K,1}^{(l)} \cdot (\lambda_{K+1} - 1) + a_{K,2}^{(l)} \cdot (\lambda_{K+1} - 1)^2, \quad (12)$$
$$a_{K+1,1}^{(l)} = 0$$
$$a_{K+1,2}^{(l)} = 0,$$

For the first segment (e.g., m=0), if the video signal range is in full range (that is, in [0, 1]), the pivot point $\lambda_0$ will be 0. In this case, $a_{0,0}{}^{(l),*}$ must be equal to the original coefficient. That is, for m=0:

$$a_{0,0}^{(l),*} = a_{0,0}^{(l)}.$$

Assuming $a'_{0,1}{}^{(l)}$ is known, $a'_{0,2}{}^{(l)}$ can be obtained from equation (9) as $$a''^{(l)}_{0,2} = \frac{\left(\hat{v}^Y_{1,\lambda_1} - a^{(l),*}_{0,0} - a'^{(l)}_{0,1}\lambda_1\right)}{(\lambda_1)^2}. \quad (13)$$

An example implementation of the gap-reducing algorithm is depicted in Tables 5 (for m=0) and Table 6 (for m>0). When m=K, the constraints of equation (12) also apply.

TABLE 5

Example process to reduce the gap among pivot points for m = 0 (first segment)

```
// For the first segment (m = 0)
// STEP 1: compute values from original polynomial in lower range and
upper range
v̂_{0,b}^Y = a_{0,0}^(l) + a_{0,1}^(l) · (s_b^Y) + a_{0,2}^(l) · (s_b^Y)^2 when λ_o ≤ b < λ_1
v̂_{1,λ1}^Y = a_{1,0}^(l) + a_{1,1}^(l) · (λ_1) + a_{1,2}^(l) · (λ_1)^2
// STEP 2: vary first coefficient and search minimal difference between
values from new coefficients and old coefficients.
D = inf;
initial {a_{0,0}^(l),*, a_{0,2}^(l),*, a_{0,2}^(l),*}
a_{0,0}^(l),* = a_{0,0}^(l)
a_{0,1}^(l),* = a_{0,1}^(l)
a_{0,2}^(l),* = a_{0,2}^(l)
for (a'_{0,1}^(l) = -a_{0,1}^(l); a'_{0,1}^(l) <= 3 · a_{0,1}^(l); a'_{0,1}^(l) += 0.001 · a_{0,1}^(l))
    // compute coefficients
```

$$a''^{(l)}_{0,2} = \frac{\left(\hat{v}^Y_{1,\lambda_1} - a^{(l),*}_{0,0} - a'^{(l)}_{0,1}\lambda_1\right)}{(\lambda_1)^2}$$

```
    if (a'_{0,0}^(l), a'_{0,1}^(l), a'_{0,2}^(l) satisfies resolution constraint (e.g., 8 bits)
        // compute distortion
```

$$D' = \sum_{b=\lambda_0+1}^{\lambda_1} \left| \sum_{k=0}^{2} a''^{(l)}_{0k} \cdot (s_b^Y)^k - \hat{v}^Y_{0,b} \right|$$

```
        if (D' < D)
            D = D';
            a_{0,1}^(l),* = a'_{0,1}^(l)
            a_{0,2}^(l),* = a'_{0,2}^(l)
        end
    end
end
```

TABLE 6

Example process to reduce the gap among pivot points for m > 0

```
// For the remaining segments, (i.e. 0 < m <= K)
// STEP 1: compute values from original polynomial in lower range
and upper range
v̂_{m,b}^Y = a_{m,0}^(l) + a_{m,1}^(l) · (s_b^Y) + a_{m,2}^(l) · (s_b^Y)^2 when λ_m ≤ b < λ_{M+1}
v̂_{m+1,λ_{m+1}}^Y = a_{m+1,0}^(l) + a_{m+1,1}^(l) · (λ_{m+1}) + a_{m+1,2}^(l) · (λ_{m+1})^2
// STEP 2: vary first coefficients and search minimal difference
between values from new coefficients and old coefficients.
D = inf; // inf denotes a very large number
initial {a_{m,0}^(l),*, a_{m,2}^(l),*, a_{m,2}^(l),*}
a_{m,0}^(l),* = a_{m,0}^(l)
a_{m,1}^(l),* = a_{m,1}^(l)
a_{m,2}^(l),* = a_{m,2}^(l)
for (a'_{m,0}^(l) = -a_{m,0}^(l); a'_{m,0}^(l) <= 3 · a_{m,0}^(l); a'_{m,0}^(l) += 0.001 · a_{m,0}^(l))
    // compute coefficients
```

$$a''^{(l)}_{m,1} = \frac{(\lambda_{m+1})^2 \left(\hat{v}^Y_{m,\lambda_m} - a''^{(l)}_{m,o}\right) - (\lambda_m)^2 \left(\hat{v}^Y_{m+1,\lambda_{m+1}} - a''^{(l)}_{m,0}\right)}{\lambda_m \lambda_{m+1}(\lambda_{m+1} - \lambda_m)}$$

$$a''^{(l)}_{m,2} = \frac{\lambda_{m+1}\left(\hat{v}^Y_{m,\lambda_m} - a''^{(l)}_{m,0}\right) - \lambda_m\left(\hat{v}^Y_{m+1,\lambda_{m+1}} - a''^{(l)}_{m,0}\right)}{\lambda_m \lambda_{m+1}(\lambda_m - \lambda_{m+1})}$$

TABLE 6-continued

Example process to reduce the gap among pivot points for m > 0

```
    if (a'_{m,0}^(l), a'_{m,1}^(l), a'_{m,2}^(l) satisfy resolution constraint (e.g., 8 bits)
        // compute distortion
```

$$D' = \sum_{b=\lambda_m+1}^{\lambda_{m+1}} \left| \sum_{k=0}^{2} a''^{(l)}_{mk} \cdot (s_b^Y)^k - \hat{v}^Y_{m,b} \right|$$

```
        if (D' < D)
            D = D';
            a_{m,0}^(l),* = a'_{m,0}^(l)
            a_{m,1}^(l),* = a'_{m,1}^(l)
            a_{m,2}^(l),* = a'_{m,2}^(l)
        end
    end
end
```

Adjusting the Forward Reshaping Functions for Reversibility

After reducing the gap between all consecutive segments, the set of final backward reshaping functions is determined. Since the gap-reduction algorithm changes the backward reshaping functions, one needs to re-build the forward reshaping functions, guaranteeing proper reversibility. This can be accomplished by reverse tracing of the backward reshaping functions.

For the l-th polynomial, one can reconstruct the output backward reshaping function $T_b^{B,(l),*}$ using, the computed polynomial coefficients $\{a_{m,0}^{(l),*}, a_{m,2}^{(l),*}, a_{m,2}^{(l),*}\}$, for all m:

$$T_b^{B,(l),*} = \sum_{k=0}^{2} a^{(l),*}_{mk} \cdot (s_b^Y)^k \text{ when } \lambda_m \le b < \lambda_{m+1}. \quad (14)$$

The corresponding updated forward reshaping function, $T_b^{F,(l),*}$, can be built by searching the codeword index which minimizes the difference between codewords generated by the backward reshaping function and the original HDR codeword. For each input HDR codeword b, to get optimal reconstruction, the ideal backward reshaping output should be as close to b as possible. Given a b value, one assumes its mapped value from forward reshaping will be k, where k can be within the entire valid SDR codeword range. By taking each valid SDR codeword through backward reshaping $T_k^{B,(l),*}$ one can find the corresponding backward mapped HDR value b. Among all those backward mapped HDR values, $T_k^{B,(l),*}$, one can find the one, $T_{k*}^{B,(l),*}$, having minimal difference from the original input HDR codeword b. In other words, for an input b, the forward reshaping mapping should map b to $T_b^{F,(l),*}=k*$. An example process is depicted in Table 7.

TABLE 7

Example process to reconstruct forward reshaping functions based on the optimized backward reshaping functions

```
for (b = 0; b < N^V; b++)
    // compute ideal reconstructed HDR value (through forward and
    backward)
```

$$\hat{v}_b = \frac{b}{N^V}$$

TABLE 7-continued

Example process to reconstruct forward reshaping functions based on the optimized backward reshaping functions // find the index having minimal difference between ideal case and from the backward reshaping function $$k^* = \underset{\{k\}}{\mathrm{argmin}} \left| \tilde{v}_b - T_k^{B,(l),*} \right| T_b^{F,(l),*} = k^*$$

end

Figure 2:
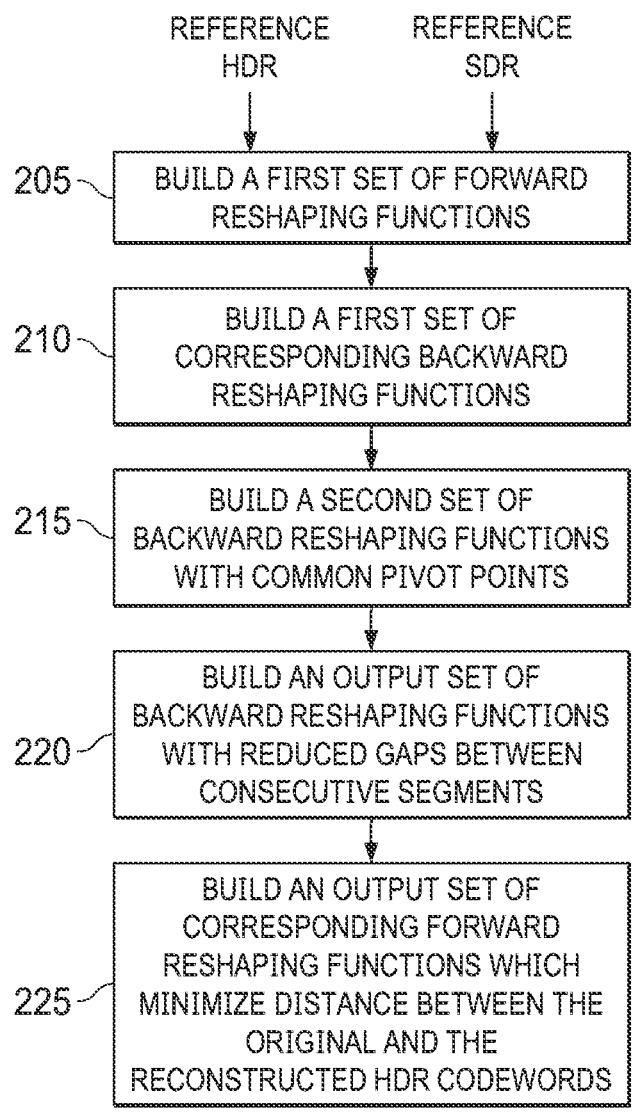
FIG. 2 depicts an example process for designing reshaping functions according to an embodiment of this invention.

FIG. 2 depicts an example process pipeline which summarizes the process described earlier to generate forward and backward reshaping functions according to constrains of continuity between pivots and reversibility. Given reference HDR and SDR images, in step 205, a first set of forward reshaping functions is constructed, wherein, each one is optimized for a specific characteristic of input HDR images, e.g., a metric of the average luminance of each frame. For example, in an embodiment, without limitation, one may generate such reshaping functions using the CDF matching criterion as described in Tables 1 and 2.

In step 210, using the first set of forward reshaping functions, one constructs a first set of backward reshaping functions, e.g., using the process depicted in Table 3. Next, in step 215, one builds a second set of backward reshaping shaping functions by a) applying a piece-wise approximation to the first set of backward reshaping shaping functions under the constrain that all functions in this set share a common set of pivots. An example process is provided in Table 4.

To improve image quality and reduce visual artifacts, in step 220, the polynomial representation of the second set of forward reshaping functions is further optimized to reduce the distance between values in neighboring pivot points, thus generating an output set of backward reshaping functions. An example process is provided in Tables 5 and 6.

Given this set of output forward reshaping functions (with optimized gap), step 225 generates an output set of forward reshaping functions under the constrain that the distance between codewords of the reference HDR input and a reconstructed HDR input (using an output backward reshaping function) is minimized. An example process is described in Table 7.

Figure 3:
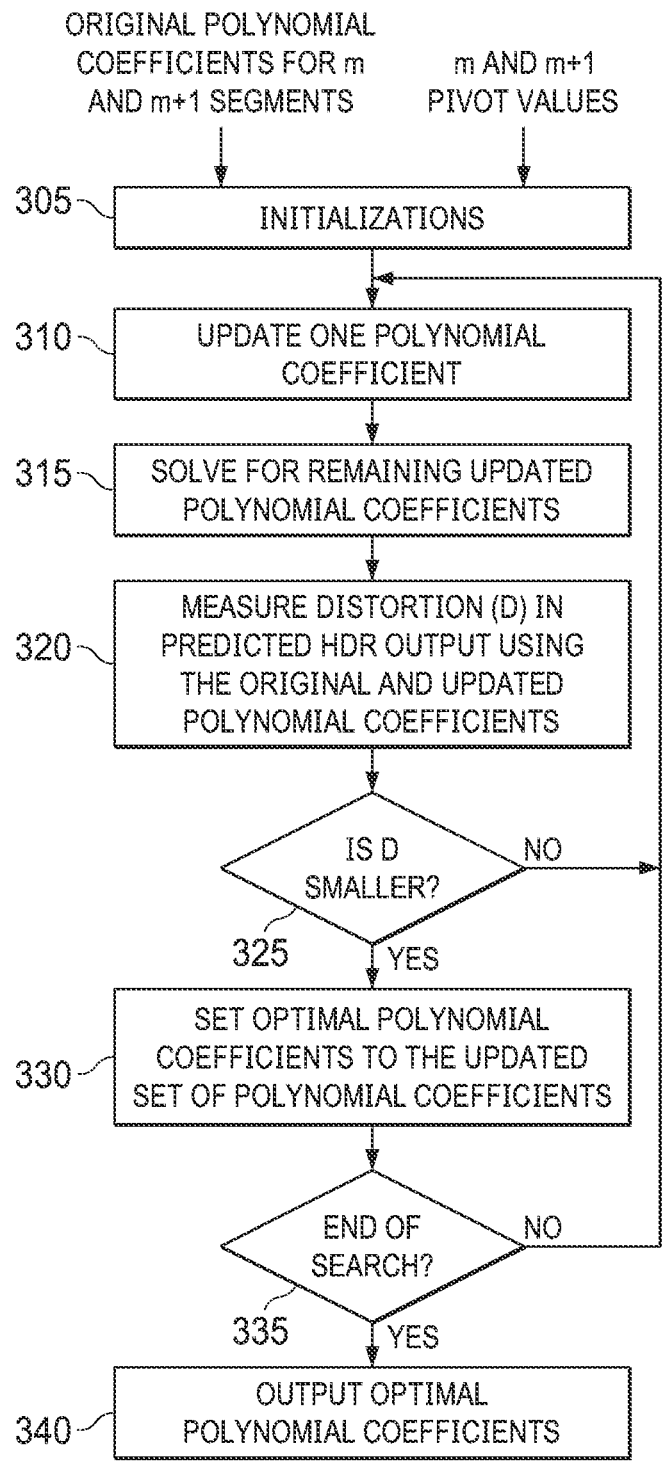
FIG. 3 depicts an example process for reducing the gap between two second-order polynomial segments in a multi-segment representation of a backwards reshaping function according to an embodiment of this invention.

Returning back to processing block 220, FIG. 3 depicts an example process for reducing the gap between two second-order polynomial segments in a multi-segment representation of a backwards reshaping function according to an embodiment. As described in Table 6, for segment m>0, reducing the gap between two segments includes the following steps:

Step 305: Initialization. This step initializes the distortion (D) to a large number, and given the original polynomial coefficients for the m-th and m+1-th segments in the l-th reshaping function, it setups how the HDR prediction values are to be computed for codewords within the m-th segment and the $\lambda_{m+1}$ pivot point, e.g.:

$$\hat{v}_{m,b}^Y = a_{m,0}^{(l)} + a_{m,1}^{(l)} \cdot (s_b^Y) + a_{m,2}^{(l)} \cdot (s_b^Y)^2 \text{ when } \lambda_m \le b < \lambda_{m+1}$$

$$\hat{v}_{m+1,\lambda_{m+1}}^Y = a_{m+1,0}^{(l)} + a_{m+1,1}^{(l)} \cdot (\lambda_{m+1}) + a_{m+1,2}^{(l)} \cdot (\lambda_{m+1})^2 \quad (15)$$

Step 310 starts an iterative process, which for a range of values for $a'_{m,0}^{(l)}$ in [A, B], with an increment C (e.g., without limitation, $A = -a_{m,0}^{(l)}$, $B = 3 \cdot a_{m,0}^{(l)}$, and $C = 0.001 \cdot a_{m,0}^{(l)}$:

in step 315, it computes the other two coefficients $a'_{m,1}^{(l)}$ and $a'_{m,2}^{(l)}$ (see equation (10))

in step 320, it computes the total distortion (see Table 6)

$$D' = \sum_{b=\lambda_m+1}^{\lambda_{m+1}} \left| \sum_{k=0}^{2} a'^{(l)}_{mk} \cdot (s_b^Y)^k - \hat{v}_{m,b}^Y \right| \quad (16)$$

in step 325, if D'<D, then the computed set of updated polynomial coefficients replaces the previous one as the new set of optimal polynomial coefficients The iterative process repeats until all values of $a'_{m,0}^{(l)}$ within [A, B] are processed.

In step 340, at the end of the iteration process, the final set of optimal polynomial coefficients ($a_{m,j}^{(l),*}$, j=0, 1, and 2) is outputted.

The process in FIG. 3 is repeated for all segments and for all the Z functions in the set of backward reshaping functions.

For the first segment (e.g., m=0), one may still apply the same iterative process, but with small variations. After initialization (see equation (15), but with m=0), because $a_{0,0}^{(l),*}$ must be equal to the original coefficient, the iteration process in step 310 now varies $a'_{0,1}^{(l)}$ in a range [A0, B0] with step C0, where, in an embodiment (see Table 5), $A0 = -a_{0,1}^{(l)}$, $B0 = 3 \cdot a_{0,1}^{(l)}$, and $C0 = 0.001 \cdot a_{0,1}^{(l)}$. Given $a_{0,0}^{(l),*}$ and $a'_{0,1}^{(l)}$, one may apply equations (11) and (16) to compute $a'_{0,2}^{(l)}$ and distortion D' in steps 315 and 320.

For the last segment (m=K), $a_{K+1,j}^{(l)}$ values for j=0, 1, and 2 (see equation (15)), are computed using equation (12).

Reshaping Function Interpolation

Given a set of L pre-computed forward reshaping functions, each one computed for a value in a set of different adaptive control signals $\{r^{(0)}, r^{(1)}, \ldots r^{(L-1)}\}$, for example r may denote the average luminance value, then, the corresponding forward reshaping functions for the three color planes (e.g., YCbCr) may be expressed as $$\hat{s}_{t,i}^{y,(l)} = FR_j^{r^{(l)},y}(v_{j,i}^y) \quad (17)$$

$$\hat{s}_{j,i}^{c0,(l)} = FR_j^{r^{(l)},c0}(v_{j,i}^y, v_{j,i}^{c0}, v_{j,i}^{c1}),$$

$$\hat{s}_{j,i}^{c1,(l)} = FR_j^{r^{(l)},c1}(v_{j,i}^y, v_{j,i}^{c0}, v_{j,i}^{c1})$$

Given a new control signal value (r) between two pre-computed values, that is, $r^{(l)} \le r < r^{(l+1)}$, one would like to derive a new forward reshaping function from the existing pre-computed functions. Assuming the new reconstructed HDR samples can be interpolated from two near samples, let $$\alpha = \frac{r^{(l+1)} - r}{r^{(l+1)} - r^{(l)}},$$

then, using linear interpolation, the HDR interpolated values can be expressed as $$\hat{s}_{j,i}^{y} = \alpha \cdot \hat{s}_{j,i}^{y,(l)} + (1-\alpha) \cdot \hat{s}_{j,i}^{y,(l+1)}, \quad (18)$$

$$\hat{s}_{j,i}^{c0} = \alpha \cdot \hat{s}_{j,i}^{c0,(l)} + (1-\alpha) \cdot \hat{s}_{j,i}^{c0,(l+1)},$$

$$\hat{s}_{j,i}^{c1} = \alpha \cdot \hat{s}_{j,i}^{c1,(l)} + (1-\alpha) \cdot \hat{s}_{j,i}^{c1,(l+1)}.$$

The interpolation of luma and chroma reshaping functions is examined next.

Interpolation of Luma Interpolation Functions

From equations (15) and (16)

$$\hat{s}_{j,i}^y = \alpha \cdot FR_j^{r(l),y}(v_{j,i}^y) + (1-\alpha) \cdot FR_j^{r(l+1),y}(v_{j,i}^y). \qquad (19)$$

Alternatively, the function form can be expressed as $$FR_j^{r,y}(\,) = \alpha \cdot FR_j^{r(l),y}(\,) + (1-\alpha) \cdot FR_j^{r(l+1),y}(\,). \qquad (20)$$

Given that all pivot points are aligned, in an embodiment, one may generate the interpolated function by directly generating an interpolated set of polynomial coefficients for each segment. For example, and without limitation, consider a multi-segment polynomial format with second-order polynomials. Assume the considered HDR range is within the m-th piece/segment, then the corresponding SDR reshaped value using the l-th and l+1-th forward reshaping functions can be expressed as:

$$FR_j^{r(l),y}(v_{j,i}^y) = \sum_{k=0}^{2} a_{mk}^{(l),y} \cdot (v_{j,i}^y)^k$$

$$FR_j^{r(l+1),y}(v_{j,i}^y) = \sum_{k=0}^{2} a_{mk}^{(l+1),y} \cdot (v_{j,i}^y)^k. \qquad (21)$$

After the polynomial interpolation, denote the new polynomial coefficients as $$a_{mk}^{(r),F} = \alpha \cdot a_{mk}^{(l),F} + (1-\alpha) \cdot a_{mk}^{(l+1),F}, \qquad (22)$$

then, the interpolated reshaped SDR value can be expressed as $$FR_j^{r,y}(v_{j,i}^y) = \sum_{k=0}^{2} a_{mk}^{(r),F} \cdot (v_{j,i}^y)^k. \qquad (23)$$

The backward reshaping function, $BR_j^{r,y}(\,)$, can be built in the same way.

Interpolation of Chroma Reshaping Functions

In an embodiment, and without loss of generality, instead of expressing reshaping functions as a multi-segment polynomial (e.g., as discussed before for the luma component), one may express reshaping using alternative schemes, such as multiple color channel, multiple regression prediction discussed in Ref. [4] and Ref. [6], where a chroma value is predicted based on a combination of both luma and chroma values.

In Ref. [6], it was shown that given $r^{(l)} \leq r < r^{(l+1)}$, MMR coefficients can be a linear combination of two nearby MMR coefficients as well, or:

$$M_t^{(r)} = \alpha M_t^{(l)} + (1-\alpha) M_t^{(l+1)}, \qquad (24)$$

where $M_t^{(l)}$ denotes the set of MMR coefficients for the l-th reshaping function. Alternatively, $$FR_j^{r,C}(\,) = \alpha \cdot FR_j^{r(l),C}(\,) + (1-\alpha) \cdot FR_j^{r(l+1),C}(\,),$$

$$BR_j^{r,C}(\,) = \alpha \cdot BR_j^{r(l),C}(\,) + (1-\alpha) \cdot BR_j^{r(l+1),C}(\,) \qquad (25)$$

where C can be color component c0 or c1 (e.g., Cb or Cr).

Figure 4:
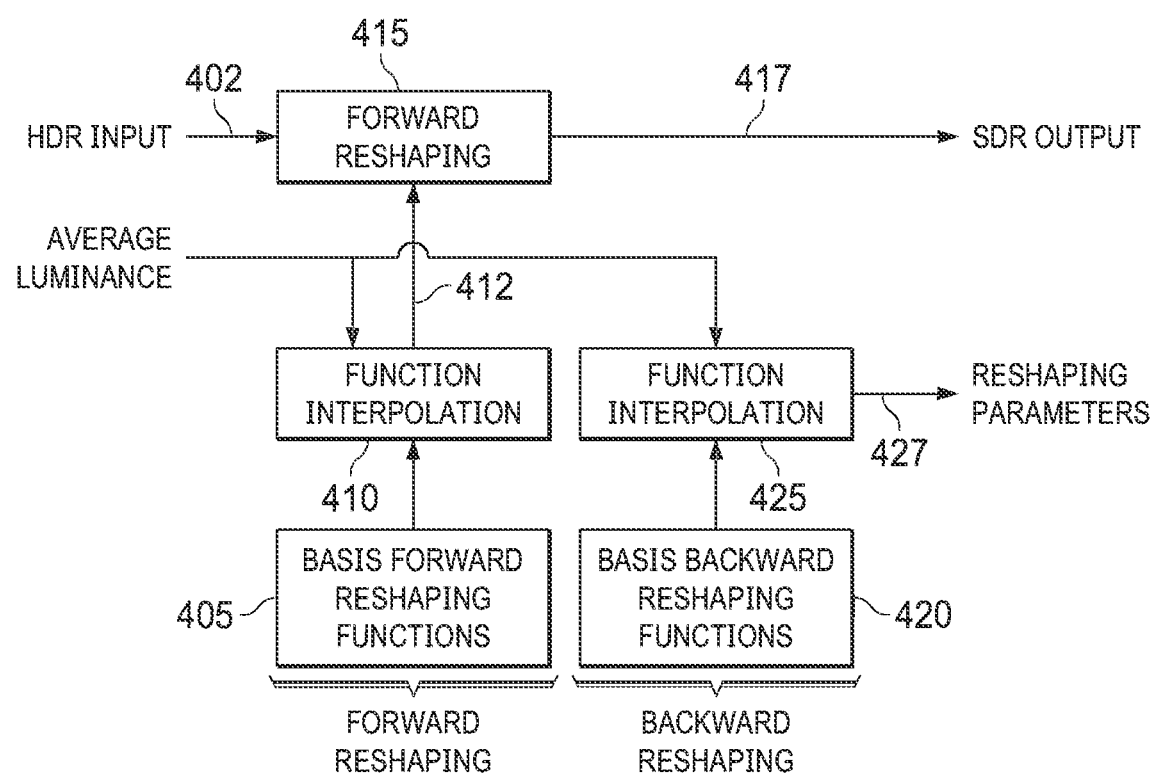
FIG. 4 depicts an example encoder using reshaping functions accord to an embodiment.

FIG. 4 depicts an example of reshaping in an encoder according to an embodiment based on the interpolation of basis forward and backward reshaping functions. As depicted in FIG. 4, the forward reshaping stage may include: a set of basis forward reshaping functions (405), a function interpolation unit (410), which can generate a new forward reshaping function (412) by interpolating from two basis forward reshaping functions, and a forward reshaping unit (415) which will apply the generated forward function (412) to generate the reshaped signal (417), e.g., an SDR signal.

Given the forward reshaping function (412), an encoder could generate the parameters of the reverse or backward reshaping function (e.g., 150) (e.g., see Ref. [5]), which could be transmitted to the decoder as was shown in FIG. 1. Alternatively, as shown in FIG. 4, the encoder may include a separate backward reshaping stage which may include: a set of basis backward reshaping functions (420), and a second function interpolation unit (425), which can generate a new backward reshaping function (427) by interpolating from two basis backward reshaping functions. The parameters of the backward reshaping function may be communicated as metadata. As discussed before, the reshaping functions may be selected based on a metric of the average luminance of the input HDR signal.

For decoding, a decoder may employ the system functionality of FIG. 1B. In another embodiment, to reduce the amount of metadata being communicated, given the L1-mid value being used by the encoder, function interpolation may also be performed at the decoder site (e.g. see Ref. [6]).

REFERENCES

Each of these references is incorporated by reference in its entirety.
1. G-M, Su et al., "Encoding and decoding reversible, production-quality single-layer video signals," PCT Application, Ser. No. PCT/US2017/023543, filed on Mar. 22, 2017, WIPO Publication WO 2017/165494.
2. Q. Song et al., "High-fidelity full-reference and high-efficiency reduced reference encoding in end-to-end single-layer backward compatible encoding pipeline," PCT Application, Ser. No. PCT/US2019/031620, filed on May 9, 2019, WIPO Publications, WO 2019/217751.
3. B. Wen et al., "Inverse luma/chroma mappings with histogram transfer and approximation," U.S. Pat. No. 10,264,287, issued on Apr. 16, 2019.
4. G-M. Su et al., "Multiple color channel multiple regression predictor," U.S. Pat. No. 8,811,490.
5. A. Kheradmand et al., "Block-based content-adaptive reshaping for high-dynamic range," U.S. Pat. No. 10,032,262.
6. H. Kadu et al., "Interpolation of reshaping functions," PCT Application, Ser. No. PCT/US2019/063796, filed on Nov. 27, 2019.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to the generation of reshaping functions, such as those described herein. The computer and/or IC may compute, any of a variety of parameters or values that relate to the generation of reshaping functions as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods for the generation of reshaping functions as described above by executing software instructions in a program memory accessible to the processors. The invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the generation of reshaping functions for HDR images are thus described. In the foregoing specification, embodiments of the present invention have been described with reference to numerous specific details that may vary from implementation to implementation. Thus, the sole and exclusive indicator of what is the invention and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for generating a reshaping function with a processor, the method comprising:
   accessing a first set of input images in a first dynamic range and a second set of input images in a second dynamic range, wherein corresponding pairs between the first set and the second set of input images represent an identical scene;
   accessing a first set of backward reshaping functions generated based on the first set of input images and the second set of input images, wherein each backward reshaping function of the first set of backward reshaping functions maps pixel codewords from a first codeword representation in the first dynamic range to a second codeword representation in the second dynamic range, and each backward reshaping function is characterized by a reshaping-index parameter and segment parameters for a segment-based representation of the backward reshaping functions with a set of common pivots; and
   adjusting the segment parameters in the first set of backward reshaping functions to generate an output set of backward reshaping functions with the same set of common pivots as the first set of backward reshaping functions but with adjusted segment-based polynomial representation, wherein adjusting the segment parameters in a backward reshaping function to generate updated polynomial coefficients comprises:
      for a segment of a backward reshaping function between a first pivot and a second pivot, wherein the segment is represented in an original polynomial representation by three original polynomial coefficients:
         i. accessing the three original polynomial coefficients of the segment;
         ii. initializing a distortion parameter to a first distortion value; and
         iii. for a new value for a first updated polynomial coefficient for the segment:
            a. solving specific equations for a second updated polynomial coefficient and a third updated polynomial coefficient for the segment based on (A) the first pivot and the second pivot, (B) the new value for the first updated polynomial coefficient, and (C) corresponding outputs for the first pivot and the second pivot according to the original polynomial representation of the segment; and
            b. upon satisfying a distortion criterion, updating an optimum set of polynomial coefficients for the segment with the updated polynomial coefficients,
   causing a reshaped image to be generated from an input image based at least in part on the backward reshaping function with the optimum set of polynomial coefficients.

2. The method of claim 1, wherein satisfying the distortion criterion comprises:
   after solving the specific equations for the first and second updated polynomial coefficients,
      computing a new distortion parameter value based on the updated polynomial coefficients and the original polynomial coefficients;
      comparing the first distortion value with the new distortion parameter value, and
      if the new distortion parameter value is smaller than the first distortion value, then satisfying the distortion criterion and updating the first distortion value with the new distortion parameter value.

3. The method of claim 2, wherein computing the new distortion parameter value comprises computing for all codewords within the segment a cumulative error between outputs generated using the original polynomial representation and the updated polynomial representation.

4. The method of claim 1, further comprising,
   generating a set of output forward reshaping functions based on the set of output backward reshaping functions, wherein a forward reshaping function maps pixel codewords from the second codeword representation in the second dynamic range to the first codeword representation in the first dynamic range.

5. The method of claim 4, wherein generating an output forward reshaping function corresponding to an output backward reshaping function comprises:
for each input codeword in the second dynamic range identifying a codeword index for the output backward reshaping function which minimizes a difference between codewords generated by the backward reshaping function and the input codeword.

6. The method of claim 1, wherein the reshaping-index parameter comprises a measure of average luminance in an input image in the second dynamic range.

7. The method of claim 1, wherein the first dynamic range comprises a standard dynamic range and the second dynamic range comprises a high dynamic range.

8. The method of claim 2, wherein for the first segment m=0 in a segment-based representation of the backward reshaping function comprising two or more segments, the original polynomial representation comprises $$\hat{v}_{0,b}^Y = a_{0,0}^{(l)} + a_{0,1}^{(l)} \cdot (s_b^Y) + a_{0,2}^{(l)} \cdot (s_b^Y)^2,$$

wherein $a_{0,0}^{(l)}$, $a_{0,0}^{(l)}$, and $a_{0,2}^{(l)}$ denote the original polynomial coefficients, l denotes the reshaping-index parameter of the backward reshaping function in the first set of backward reshaping functions, and $s_b^Y$ denotes an input codeword in the first dynamic range between the first pivot ($\lambda_0$) and the second pivot ($\lambda_1$), and given the new value for the first updated polynomial coefficient $a'_{0,1}{}^{(l)}$, solving for the second updated polynomial coefficient and the third updated polynomial coefficient comprises computing:

$$a_{0,0}^{(l),*} = a_{0,0}^{(l)},$$

$$a_{0,2}^{\prime(l)} = \frac{\left(\hat{v}_{1,\lambda_1}^Y - a_{0,0}^{(l),*} - a_{0,1}^{\prime(l)}\lambda_1\right)}{(\lambda_1)^2},$$

wherein $a_{0,0}^{(l),*}$ denotes the optimum updated coefficient for ach, wherein $a_{0,0}^{(l)}$, $a'_{0,2}{}^{(l)}$ denotes the, updated coefficient for $a_{0,2}^{(l)}$ and $$\hat{v}_{1,\lambda_1}^Y = a_{1,0}^{(l)} + a_{1,1}^{(l)} \cdot (\lambda_1) + a_{1,2}^{(l)} \cdot (\lambda_1)^2$$

denotes an output of the original polynomial representation of the second segment in the backward reshaping function for the second pivot.

9. The method of claim 8, wherein the first updated polynomial coefficient iterates in a range of values $[-a_{0,1}^{(l)}, n \cdot a_{0,1}^{(l)}]$, where n is an integer value smaller than 5.

10. The method of claim 8, wherein computing the new distortion parameter value (D') comprises computing $$D' = \sum_{b=\lambda_0+1}^{\lambda_1} \left| \sum_{k=0}^{2} a_{0,k}^{\prime(l)} \cdot (s_b^Y)^k - \hat{v}_{0,b}^Y \right|.$$

11. The method of claim 2, wherein for segment m, m>0, in the segment-based representation of the backward reshaping function, the original polynomial representation comprises $$\hat{v}_{m,b}^Y = a_{m,0}^{(l)} + a_{m,1}^{(l)} \cdot (s_b^Y) + a_{m,2}^{(l)} \cdot (s_b^Y)^2,$$

where $a_{m,0}^{(l)}$, $a_{m,0}^{(l)}$, and $a_{m,2}^{(l)}$ denote the original polynomial coefficients, l denotes the reshaping-index parameter of the backward reshaping function in the set of backward reshaping functions, and $s_b^Y$ denotes an input codeword in the first dynamic range between the first pivot ($\lambda_m$) and the second pivot ($\lambda_{m+1}$), and given the new value for the first updated polynomial coefficient $(a'_{m,0}{}^{(l)})$, solving the specific equations for the second updated polynomial coefficient $(a'_{m,1}{}^{(l)})$ and the third updated polynomial coefficient $(a'_{m,2}{}^{(l)})$ comprises computing:

$$a_{m,1}^{\prime(l)} = \frac{(\lambda_{m+1})^2 \left(\hat{v}_{m,\lambda_m}^Y - a_{m,0}^{\prime(l)}\right) - (\lambda_m)^2 \left(\hat{v}_{m+1,\lambda_{m+1}}^Y - a_{m,0}^{\prime(l)}\right)}{\lambda_m \lambda_{m+1}(\lambda_{m+1} - \lambda_m)},$$

$$a_{m,2}^{\prime(l)} = \frac{\lambda_{m+1}\left(\hat{v}_{m\lambda m} - a_{m,0}^{\prime(l)}\right) - \lambda_m\left(\hat{v}_{m+1,\lambda_{m+1}}^Y - a_{m,0}^{\prime(l)}\right)}{\lambda_m \lambda_{m+1}(\lambda_m - \lambda_{m+1})},$$

wherein $$\hat{v}_{m+1,\lambda_{m+1}}^Y = a_{m+1,0}^{(l)} + a_{m+1,1}^{(l)} \cdot (\lambda_{m+1}) + a_{m+1,2}^{(l)} \cdot (\lambda_{m+1})^2$$

denotes an output of the original polynomial representation of segment m+1 in the backward reshaping function for the second pivot.

12. The method of claim 11, wherein the first updated coefficient iterates in a range of values, $[-a_{m,0}^{(l)}, n \cdot a_{m,0}^{(l)}]$, where n is an integer value smaller than 5.

13. The method of claim 11, wherein computing the new distortion parameter value (D') comprises computing $$D' = \sum_{b=\lambda_m+1}^{\lambda_{m+1}} \left| \sum_{k=0}^{2} a_{mk}^{\prime(l)} \cdot (s_b^Y)^k - \hat{v}_{m,b}^Y \right|.$$

14. The method according to claim 1, further comprising generating a new backward reshaping function by interpolating between two backward reshaping functions of the output set of backward reshaping functions, the two backward reshaping functions being characterized by different reshaping-index parameters.

15. The method according to claim 4, further comprising generating a new forward reshaping function by interpolating between two forward reshaping functions of the set of output forward reshaping functions, the two forward reshaping functions being characterized by different reshaping-index parameters.

16. The method according to claim 14, wherein interpolating between two backward or forward reshaping functions comprises generating an interpolated set of polynomial coefficients for each segment of the new backward or forward reshaping function, based on a set of polynomial coefficients of the two backward or forward reshaping functions.

17. The method according to claim 14, further comprising selecting said two backward or forward reshaping functions based on a measure of an average luminance of an input HDR image to be encoded.

18. A non-transitory computer-readable storage medium having stored thereon computer-executable instructions for executing with one or more processors a method in accordance with claim 1.

19. An apparatus comprising a processor and configured to perform the method recited in claim 1.

* * * * *